June 6, 1950     E. D. RAPISARDA     2,510,657
LIQUID SAMPLING DEVICE
Filed Dec. 14, 1948     2 Sheets-Sheet 1
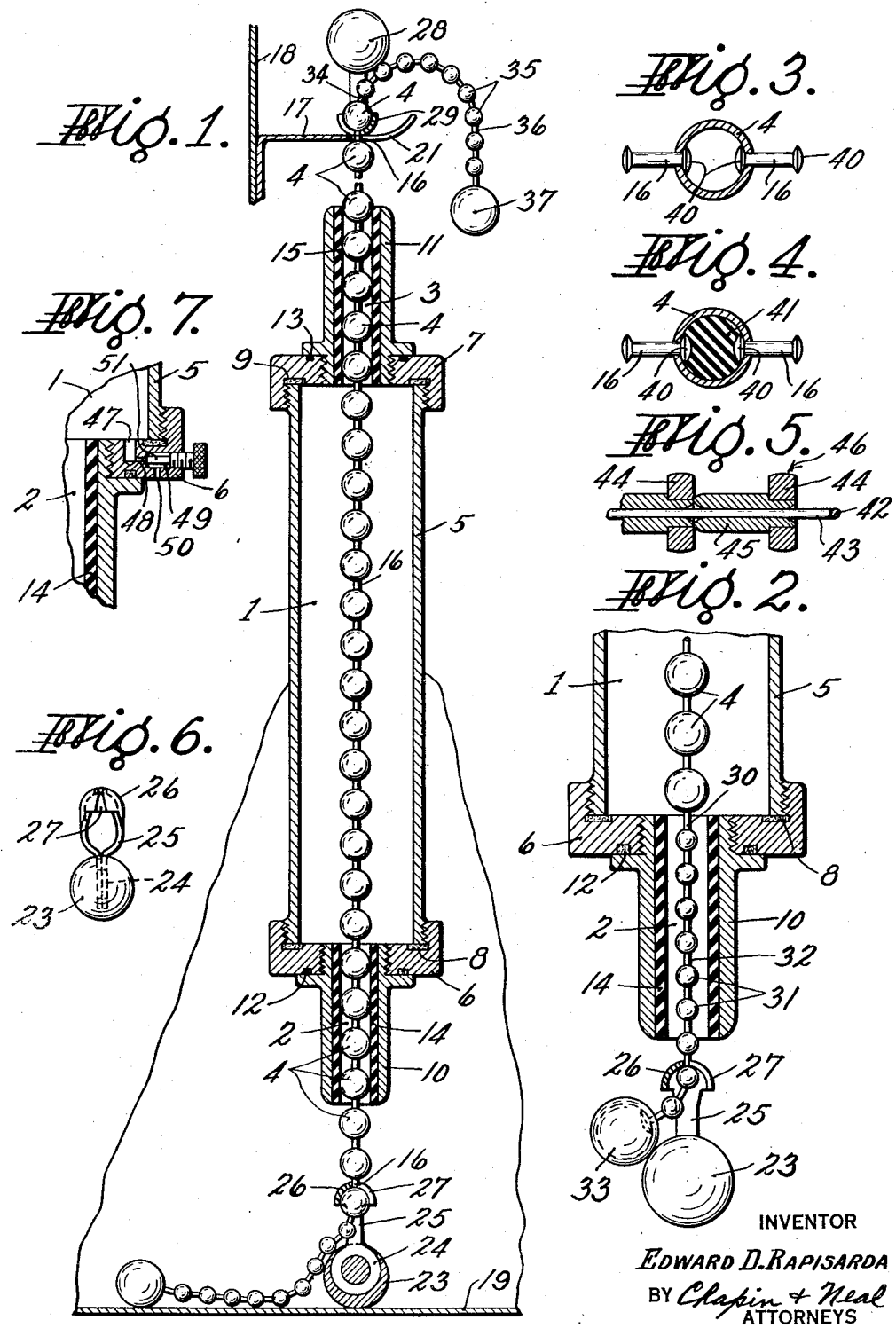
INVENTOR
*Edward D. Rapisarda*
BY *Chapin & Neal*
ATTORNEYS June 6, 1950 E. D. RAPISARDA 2,510,657
LIQUID SAMPLING DEVICE
Filed Dec. 14, 1948 2 Sheets-Sheet 2
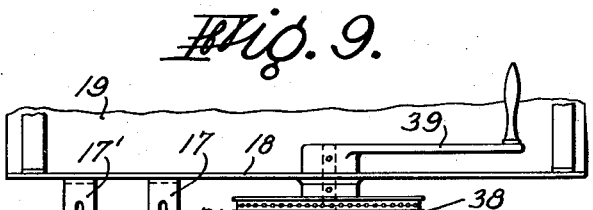
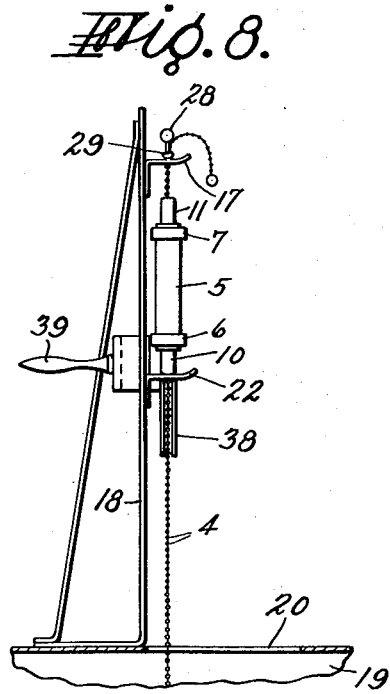
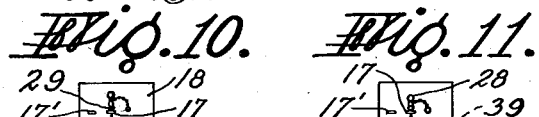
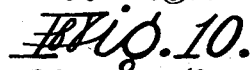
INVENTOR
EDWARD D. RAPISARDA
BY Chapin & Neal
ATTORNEYS Patented June 6, 1950

2,510,657

UNITED STATES PATENT OFFICE 2,510,657

LIQUID SAMPLING DEVICE

Edward D. Rapisarda, Agawam, Mass., assignor to Gilbert & Barker Manufacturing Company, West Springfield, Mass., a corporation of Massachusetts Application December 14, 1948, Serial No. 65,121

5 Claims. (Cl. 73—425.4)

This invention relates to an improved device for sampling liquids from containers.

The invention is especially useful in taking samples from tanks, such as storage tanks, which are of considerable depth and in which the contents stratify. In the oil industry, for example, crude oil stratifies in a storage tank and the contents of the tank are not homogeneous at different levels.

The object of this invention is to provide an improved sampling device, which is of simple and inexpensive construction and which is easily operated to obtain a representative sample of the entire body of liquid in a storage tank.

Another object of the invention is to provide a liquid sampling device for the purpose described and so constructed that the accuracy of sampling is not affected by variations in viscosity of the liquid or by variations in hydraulic head.

More particularly, the invention has for an object to provide a sampling receptacle, having at opposite ends thereof cylinders, through which and the intervening receptacle extends a long member having thereon a large number of longitudinally-spaced pistons to slidably fit the cylinders. Such member is adapted to be mounted so as to extend through the liquid in a storage tank and the receptacle with its cylinders is adapted to slide downwardly on the member so that volumes of liquid in the tank are successively trapped between successive pistons and delivered through the lower cylinder into the receptacle and so that like volumes of air or other fluid from the receptacle are successively trapped and delivered through the upper cylinder out into the storage tank.

These objects will best be understood from the detailed description of one illustrative example of the invention with reference to the accompanying drawings, in which:

Fig. 1 is a sectional elevational view of a sampling device embodying the invention shown in sampling position in and near the bottom of a liquid storage tank;

Fig. 2 is a fragmentary sectional elevational view of the sampling device shown in position for emptying the sample of liquid taken from the tank;

Figs. 3, 4 and 5 are fragmentary sectional views illustrative of different ways of constructing the piston-carrying member on which the sampling receptacle is slidable;

Fig. 6 is an elevational view of a stop device for attachment to the piston-carrying member in order to limit the movement of the sampling receptacle thereon and enable the receptacle to be lifted from the tank by pulling upwardly on such member;

Fig. 7 is a fragmentary sectional elevational view showing a venting device for optional use with the sampling receptacle;

Fig. 8 is a side elevational view of a device for suspending the flexible member in a tank and for retaining the sampling receptacle from movement on such member;

Fig. 9 is a top plan view showing two such suspending devices and a windlass for use in raising the sampling receptacle from the tank; and Figs. 10 to 15 inclusive are diagrammatical views illustrating successive steps in the operation of the sampling device.

Referring to these drawings and first to Fig. 1 thereof; the sampling device comprises a receptacle 1 to receive the sample with coaxial cylinders 2 and 3, one at each of two opposite ends of the receptacle, and a longitudinal series of interconnected pistons 4, on which the cylinders 2 and 3 are slidable and by means of which volumes of liquid from the tank to be sampled are delivered through the lower cylinder 2 into the sampling receptacle 1 and volumes of air from the receptacle are delivered through the upper cylinder 3 out into the tank.

The receptacle 1 may be of any suitable shape. Conveniently it is formed by a cylindrical tube 5 with caps or heads 6 and 7, threaded one on each of two opposite ends thereof and acting to clamp gaskets 8 and 9 respectively against the ends of the cylinder to make tight joints. The cylinders 2 and 3 are conveniently formed in tubular posts 10 and 11, which are flanged and threaded near one end to screw into caps 6 and 7, respectively, and which act to clamp gaskets 12 and 13 against the caps 6 and 7, respectively, to form tight joints. The receptacle 1 is thus tightly closed except for the passages through the two cylinders 2 and 3. These cylinders 2 and 3 may, if desired, be provided with linings 14 and 15, respectively, of suitable resilient and oil-proof material, such as synthetic rubber, for example, and the pistons have a close but sliding fit with these linings. The length of each cylinder must at least be slightly greater than the center to center distance between successive pistons and preferably such length is several times said distance, the more effectively to seal the receptacle against the entrance or discharge of fluid except when the cylinders and pistons are relatively moved.

The interconnected pistons are adapted to be mounted so as to extend through whatever area of the tank is to be sampled. Usually, but not necessarily in all cases, these pistons will extend from top to bottom of the tank in a vertical series, as indicated. For this more customary use, the pistons are carried in longitudinally spaced relation on a flexible member or the ball-like pistons 4 are flexibly connected one to the other, as by the links 16, into the well known ball chain, forming a flexible member, which can readily be suspended from the top of the tank and extend vertically downward to the bottom of the tank. However, the flexible member could be stretched between two points in the tank and extend in a downward incline from the upper to the lower of these points. Also the piston-carrying member could be rigid although that is not generally as convenient and desirable a form, especially for tanks of great depth.

In Fig. 8 there is shown one example of how the flexible piston-carrying member may be suspended. This member is suspended by its uppermost piston 4 (for the exact detail see Fig. 1) from a bracket 17, fixed to a wall 13, suitably attached to the top of a tank 19 to be sampled and overlying an opening 20 in such tank. In the bracket 17 (Fig. 9) is a slot 21 wide enough to receive one of the connecting links 16 but too narrow to allow passage of a piston 4. Below bracket 17 and fixed to wall 18 is a second bracket 22 for supporting the sampling receptacle. The lower end of tube 10 rests on top of the bracket 22 and there is a slot in this bracket wide enough to allow passage of the pistons but too narrow to allow passage of tube 10. For deep tanks, it may be necessary to provide a small weight, such as is shown at 23 in Fig. 1, to counteract the lifting force exerted on the lowermost piston 4 in the lower cylinder 2 by the hydraulic head of the liquid in the tank and tending to force it upwardly in the lower cylinder 2. As shown, this weight is cast around a standard clip, having an eye 24 and connected by two spaced arms 25 to a semi-spherical shell 26, having a slot 27. This shell rests on top of the lowest ball-like piston 4 with the link 16 engaged in slot 27. A similar weight 28 and attaching clip 29 are preferably provided for the upper piston 4 for reasons which will later be explained in detail.

With the piston-carrying member arranged in the storage tank as described, the sampling is effected by simply allowing the sampling receptacle 1 to slide down on such member. For example, one may move the receptacle to the right, as viewed in Fig. 8, until it is free of the bracket 22 and then release it, whereupon it will slide downwardly on the piston-carrying member until its lower end is arrested by the abutment of the lower end face of tube 10 with the clip 26. By reference to Fig. 1, it will be clear that as the receptacle 1 slides downwardly over the series of interconnected ball-like pistons 4, the leading end of the receptacle, the tube 10, will enter the liquid and cut off the volume of liquid between the first two pistons which are submerged. This volume of liquid does not move but the cylinder moves down over it until such volume is trapped in the lower cylinder 2. This volume is equal to that of a cylinder having the same outside diameter as a piston 4 and a height equal to the center to center distance between two successive pistons, minus the volume of a sphere of the same diameter as the piston minus the volume of the cylinder comprising the portion of link 16 exposed between two successive pistons. Other like volumes of liquid are successively trapped in the cylinder 2, as the receptacle continues to slide downwardly, and are successively delivered from this cylinder into the receptacle 1 as the upper end of the cylinder passes below each pair of pistons which carry liquid between them. As each such volume of liquid enters the receptacle 1, a corresponding volume of air is carried out of the receptacle into the upper cylinder 3 between other pairs of pistons 4 and liberated into tank 19. In this way, volumes of liquid are taken at a large number of levels in the tank and a fairly representative sample of the liquid in the tank is had, sufficiently so for all practical purposes.

When the sample has been taken by allowing the receptacle to slide down the piston-carrying member to the bottom of the tank, the receptacle is lifted out of the tank and emptied. This may be done by pulling up on the piston-carrying member by hand or in any other suitable way. After the receptacle has been removed from the tank, the clip 26 is detached from the lowermost ball 4 to allow the receptacle to slide downwardly until all the balls 4 have passed out of cylinder 2 into the receptacle, or as indicated in Fig. 2. The lowermost ball may be connected by a link 30 with a small ball chain comprising balls 31 and links 32, interconnecting successive balls 31. The latter are of less diameter than cylinder 2 and the liquid in the receptacle can be poured out through the lower cylinder 2 as a nozzle into a suitable receptacle. To prevent the lower end of chain 31, 32 from being entirely pulled into the cylinder, a large ball 33 is provided on the end of this small chain. The chain 31, 32 preferably passes through the opening between the side arms 25, the clip 26 and weight 23 so that the weight and stop clip 26 will always be available for use. Either the ball 33 on some part of the clip or its weight will abut the lower end of tube 10 and prevent the chain 31, 32 from being drawn too far into the lower cylinder.

The uppermost ball 4 may also be connected by a link 34 to a small ball chain comprising balls 35 and links 36 interconnecting them. This small chain terminates with a large ball 37 and, like the other small chain, is threaded through the space between the clip 29, its weight 28 and arms which interconnect 29 and 28. These provisions enable the sampling device to be reversed, if desired. For example, having taken a sample as above described and having lifted the receptacle out of the tank 19 and emptied it, the weight 28 may be lowered into the tank 19 and the piston-carrying member may then be suspended from its end which carries the weight 23, whereby the receptacle will be inverted and can slide down the member until it is arrested by the clip 29.

The usefulness of this arrangement will best appear from a consideration of the diagrams in Figs. 10 to 15, inclusive. A windlass is shown, mounted on support 18, to assist in raising the sampling receptacle. This windlass may consist of a wheel 38, formed to receive a ball chain, such as that afforded by the interconnected pistons 4 described, and a crank 39 for turning the wheel 38. Adjacent the brackets 17 and 22, there may be two other corresponding brackets 17' and 22'. The sampling operation, just described, is illustrated in Figs. 10 and 11 at the start and at the end, respectively. The piston-carrying member is suspended from bracket 17 by means of the clip 29 and the ball 4, which it engages, and the receptacle is supported by bracket 22. The weight 23 lies at the bottom of the tank. The receptacle 1 may then be released from clip 22 and allowed to slide downwardly until arrested by clip 26. The sample, having been taken, the receptacle may be lifted out of tank 19 by means of the described windlass. The flexible piston-carrying member is swung over the windlass wheel 38, as indicated in Fig. 12, and crank 39 is turned, thereby drawing up the receptacle, as indicated in Fig. 13. A part of the flexible piston-carrying member extends down into the tank in a loop to the left of wheel 38 as shown in Fig. 13. This loop increases in length as the receptacle is drawn up, reaching its maximum when the parts are in the positions shown in Fig. 14. The receptacle 1 is then emptied, and the empty receptacle is hung up upon the bracket 22' while the piston-carrying member is hung up on the bracket 17' by the clip 26. Then, the other end of the piston-carrying member is detached from bracket 17 and allowed to drop into the tank 19, whereupon the parts assume the positions shown in Fig. 15 with the receptacle inverted in readiness to slide down the reversed flexible member.

The flexible piston-carrying member may be variously constructed as desired. The ordinary ball chain construction, shown in Fig. 3, may be used in which hollow spherical balls are interconnected by links 16 having enlarged heads 40, located inside the hollow balls. If the ends 40 tightly fit the balls so as to avoid leakage into the latter, the Fig. 3 arrangement is satisfactory. In Fig. 4, the hollow balls are shown filled with resilient sealing material 41, which may for example be synthetic rubber and applied by vacuum impregnation. In Fig. 5, a braided wire 42, covered with a nylon sleeve 43, carries a series of longitudinally-spaced disk pistons 44 separated by spaced sleeves 45. The disks 44 may have part-spherical surfaces 46 to engage the cylinder walls. Each sleeve 45 may be shouldered down at one end and such end press fitted into a central hole in one piston while the other end is rounded to abut the adjacent face of the adjacent piston 44. The hole through each sleeve 45 is outwardly flared at each end as shown, providing for flexibility, when necessary. When suspended similarly to the ball chain, the sleeves 45 and disks 44 are tightly pressed together by their weight.

If desired, venting means may be provided to assist in emptying the sampling receptacle. preferably, one such means is provided in each of the caps 6 and 7 so that whichever cap is held uppermost, a venting means will be available. In Fig. 7, a venting means for cap 6 is shown. A series of intersecting holes 47, 48, 49 and 50 are formed in cap 6, leading from the interior of the receptacle 1 to its exterior. A needle valve 51, threaded into cap 6, has its inner end arranged to normally close off communication between the holes 48 and 49 but may be moved to allow such communication when required.

It should be noted that the sampling is effected in such a way that its accuracy is not adversely affected by variations in the hydraulic head of the liquid. Consequently, the invention can be used satisfactorily in storage tanks, which are relatively deep. The liquid does not flow through the cylinder of the sampling receptacle under hydraulic pressure. The receptacle is initially under atmospheric pressure and remains so as it travels downward through the liquid in the tank because, as each volume of liquid is delivered into the receptacle from the lower cylinder, a like volume of air is removed from the receptacle and through the upper cylinder and delivered into the tank. The several pistons in each cylinder seal the same against the passage of liquid or air through the cylinders except in the planned manner, which is by trapping it between two successive pistons as the cylinder 2 slides down over them and continuing the downward movement of the cylinder until slightly more than half of the upper one of said pistons is located in the receptacle, whereupon the liquid can flow out into the receptacle. The liquid volumes thus successively taken into the receptacle are static. They do not move at all until they are in the receptacle. The cylinder 2 simply slides down over these volumes of liquid. The air is removed in the same manner. Volumes of air are successively trapped between sucessive pistons 4 as the upper cylinder 3 slides downwardly and these are later liberated when the space between each pair of trapping pistons communicates with the liquid in the tank. Hydraulic pressure cannot move the pistons. The lowermost piston 4 in the lower cylinder 2 is acted on by hydraulic pressure with a tendency to be thrust upwardly but this is resisted by the weight 23. This weight need not be very great. For example, in the case of a tank thirty feet deep and ball pistons 4 three-eighths of an inch in diameter, a weight of about two pounds will suffice. The method of getting the liquid into the sampling receptacle is also not affected by variations in viscosity of the liquid in the same sense because the liquid does not flow into the cylinder but is static and the cylinder 2 moves over the trapped volumes of liquid.

The invention thus provides a simple and inexpensive sampling device which is easy to instal in any tank and easy to operate. The device provides for securing a representative sample of liquid from a tank, in which the contents tend to stratify, and it can be also used satisfactorily in very deep storage tanks.

I claim:

1. A device for sampling liquids from containers, comprising; a receptacle consisting of a peripheral wall and end walls one at each end of the peripheral wall affording between them a chamber, said end walls having passages therethrough one in each forming cylinders of the same cross sectional shape and area and of a cross sectional area less than that of said chamber, said receptacle being closed except for said cylinders, and a member much longer than the receptacle and extending through both cylinders and the chamber and having a series of longitudinally-spaced piston portions each of a shape and size to slidably engage the cylinders and having between successive piston portions other portions of smaller cross sectional area, each cylinder having a length at least as great as the center to center distance between sucessive piston portions.

2. A device for sampling liquids, comprising, a member adapted to be positioned in a container of the liquid to be sampled so that it extends downwardly through the liquid, said member having along its length a series of longitudinally-spaced piston portions, which are of the same cross sectional shape and area, and other portions of less cross sectional area located one between each pair of successive piston portions; and a receptacle consisting of a peripheral wall and top and bottom walls at the ends of the peripheral wall, said walls affording between them a chamber, said top and bottom walls having cylinders one in each which are of the same cross sectional shape and area and of a shape and area to slidably fit the piston portions and which are at least as great in length as the spacing between successive piston portions; said receptacle being closed except for said cylinders, said receptacle adapted to be mounted on said member with the latter extending through the top cylinder, said chamber and the bottom cylinder and with the cylinders slidably engaging successive piston portions as the receptacle slides downwardly on said member; whereby volumes of liquid between successive piston portions will be successively carried into and through the lower cylinder and delivered into said chamber as the receptacle slides downwardly on the member and whereby volumes of gas between successive piston portions will be successively carried out of said chamber through the upper cylinder and into the container.

3. A device for sampling liquids, comprising, a member adapted to be positioned in a container of the liquid to be sampled so that it extends downwardly through the liquid; said member having along its length a series of longitudinally-spaced piston portions, which are of the same cross sectional shape and area and other portions of less cross sectional area located one between each pair of successive piston portions; a receptacle consisting of a peripheral wall and top and bottom walls at the ends of the peripheral wall, said walls affording between them a chamber, said end walls having cylinders one in each which are of the same cross sectional shape and area and of a shape and area to slidably fit the piston portions and which are at least as great in length as the spacing between successive piston portions; said receptacle being closed except for said cylinders, said receptacle adapted to be mounted on said member with the latter extending through the top wall, said chamber and the bottom cylinder and with the cylinders slidably engaging the successive piston portions as the receptacle slides downwardly on said member; whereby volumes of liquid between successive piston portions will be successively carried into and through the lower cylinder and delivered into the chamber as the receptacle slides downwardly on the member and whereby volumes of gas between successive piston portions will be successively carried out of the chamber through the upper cylinder and into the container, and a stop on said member engageable by the leading end of the lower wall as the receptacle slides downwardly to limit its downward movement and prevent the piston portions being pulled through the lower cylinder into said chamber and also to enable the receptacle to be lifted out of the tank by pulling upwardly on said member, said stop being detachable from said member to enable the lowermost piston to be drawn through the lower cylinder into the chamber to open such cylinder and enable the sample in the chamber to be drawn off through the lower cylinder.

4. A device for sampling liquids, comprising, a member adapted to be positioned in a container of the liquid to be sampled so that it extends downwardly through the liquid; said member having along its length a series of longitudinally-spaced piston portions, which are of the same cross sectional shape and area and other portions of less cross sectional area located one between each pair of successive piston portions; a receptacle consisting of a peripheral wall and top and bottom walls at the ends of the peripheral wall, said walls affording between them a chamber, said end walls having cylinders one in each which are of the same cross sectional shape and area and of a shape and area to slidably fit the piston portions and which are at least as great in length as the spacing between successive piston portions; said receptacle being closed except for said cylinders, said receptacle adapted to be mounted on said member with the latter extending through the top cylinder, said chamber and the bottom cylinder and with the cylinders slidably engaging the successive piston portions as the receptacle slides downwardly on said member; whereby volumes of liquid between successive piston portions will be successively carried into and through the lower cylinder and delivered into the chamber and volumes of gas between successive piston portions will be successively carried out of the chamber through the upper cylinder and into the container as the receptacle slides downwardly on the member, a stop on said member engageable by the leading end of the lower end wall as the receptacle slides downwardly to limit its downward movement and prevent the piston portions being pulled through the lower cylinder into said chamber and also to enable the receptacle to be lifted out of the tank by pulling upwardly on said member, said stop being detachable from said member to enable the lowermost piston to be drawn through the lower cylinder into the chamber to open such cylinder and enable the sample in the chamber to be drawn off through such cylinder, a flexible member of less cross sectional area and of greater length than a cylinder and connected at one end to the lower piston portion, and a stop on the other end of said flexible member of larger cross sectional area than a cylinder, said flexible member and stop preventing the piston-carrying member from being drawn out of said chamber.

5. A device for sampling liquids, comprising, a series of flexibly interconnected pistons of the same cross sectional shape and area mounted in longitudinally spaced relation and of sufficient length to extend downwardly through the liquid to be sampled, and a receptacle consisting of a peripheral wall and heads one at each end of the peripheral wall, and having passages therethrough one in each forming cylinders of a cross sectional shape and area to slidably fit the pistons and of a length great enough to receive at least two pistons at the same time, said wall and heads enclosing a chamber which is closed except for said cylinders, said receptacle adapted to be slidably mounted on said member with the latter extending through both cylinders and the intervening chamber.

EDWARD D. RAPISARDA.

REFERENCES CITED

The following references are of record in the file of this patent:

UNITED STATES PATENTS

| Number | Name | Date |
| --- | --- | --- |
| 780,099 | Goodner | Jan. 17, 1905 |
| 1,603,712 | Peck | Oct. 19, 1926 |
| 2,298,627 | Proudman et al. | Oct. 13, 1942 |
| 2,361,663 | Stine | Oct. 31, 1944 |

FOREIGN PATENTS

| Number | Country | Date |
| --- | --- | --- |
| 1,835 | Great Britain | 1859 |